United States Patent Office 3,728,287
Patented Apr. 17, 1973

3,728,287
HYDROLYZING POLYESTERS
Chester F. Burmaster, Rochester, N.Y., assignor to
Eastman Kodak Company, Rochester, N.Y.
No Drawing. Filed Oct. 18, 1971, Ser. No. 190,291
Int. Cl. C08g 53/22
U.S. Cl. 260—2.3        7 Claims

ABSTRACT OF THE DISCLOSURE

A process hydrolyizing polyesters comprising intermixing polyester articles and caustic 2-methoxyethanol or 2-ethoxyethanol and heating the resulting mixture for a short period of time.

FIELD OF THE INVENTION

This invention relates generally to a process for hydrolyzing polyesters and more particularly to rapid hydrolytic agents for polyesters.

BACKGROUND OF THE INVENTION

The preparation of polyesters consisting essentially of recurring groups having the structure:

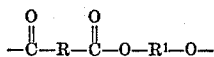

wherein R represents the radical obtained by removing the carboxyl groups from a difunctional dicarboxylic acid, and $R^1$ represents the radical obtained by removing the hydroxyl groups from a difunctional glycol, by esterification or ester exchange and condensation is well known. A common feature of these processes is that they begin with a dicarboxylic acid or a lower dialkyl ester of a bifunctional dicarboxylic acid which is condensed with a bifunctional glycol. Such processes involve the initial preparation, in the presence of a catalyst, of a substantially monomeric compound under conditions facilitating the removal of the lower alkanol formed from the lower dialkyl ester by ester interchange with the glycol. This is sometimes referred to as the first stage of the polyester preparation and may be conducted under a variety of conditions.

The second stage of polyester preparation involves taking the prepolymer and causing it to undergo a polymerization reaction. The polymerization of the prepolymer may be by melt phase or solid phase techniques well known in the art. The degree of polymerization, the acid and the glycol content influence the physical properties of the polyester. For example, the diethylene glycol content influences the melting point of the polyester.

Since the physical properties, specifically the melting point, are important to the producer of the polyester, it is important that the producer be able to determine the acid and glycol content of the polyester. The tests for acid and glycol content of polyesters are well known in the art; the first step of which is to hydrolyze the polyester. In the past the process for hydrolyzing polyesters has been long, involving a matter of hours or days. Efforts to shorten the time have involved pressure vessels and reagents which may influence the diethylene glycol content of the hydrolyzed polyester, neither of which is desirable.

SUMMARY OF THE INVENTION

It is therefore an object of the present invention to provide a rapid process for hydrolyzing polyesters. A further object of this invention is to provide a simple process for hydrolyzing polyesters. Another object of this invention is to provide a rapid process for hydrolyzing poly (ethylene terephthalate).

These and other objects and advantages of this invention are obtained by intermixing the polyester article and caustic 2-methoxyethanol or 2-ethoxyethanol and heating the mixture for a short time to complete the hydrolysis.

DETAILED DESCRIPTION OF A PREFERRED EMBODIMENT

It has been found that rapid hydrolysis of polyesters consisting of recurring groups having the structure:

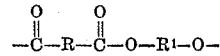

wherein R represents the radical obtained by removing the carboxyl groups from a difunctional dicarboxylic acid, and $R^1$ represents the radical obtained by removing the hydroxyl groups from a difunctional glycol, may be carried out by intermixing the polyester article and caustic 2-methoxyethanol or 2-ethoxyethanol and heating the mixture for a short time to complete the hydrolysis.

The 2-methoxyethanol or 2-ethoxyethanol is made caustic, as for example, by adding an alkali metal hydroxide such as sodium or potassium hydroxide to the 2-methoxyethanol or 2-ethoxyethanol. The hydroxide may be added in the solid form or dissolved in water and in the amounts of from about 2 grams to 3 grams hydroxide to from about 10 ml. to about 20 ml. 2-methoxyethanol. In dissolving the hydroxide in water from about 20 to 30 weight percent hydroxide to from about 80 to 70 weight percent water is used.

The physical form of the solid polyester to be hydrolyzed is not critical. Thus, fibers, films, powder, pellets, coarse particles, molded pieces, chunks, and sheets may be effectively hydrolyzed by the process of this invention. The degree of fineness of the article will influence to some degree the time of hydrolysis. With fine powder hydrolysis will be obtained in a matter of seconds whereas with coarser articles such as sheets, hydrolysis will occur in a few minutes.

The intermixing of the polyester particles and the caustic 2-methoxyethanol or 2-ethoxyethanol is in amounts of from about 10 to 20 weight percent. The mixture should then be heated to about 120° C. to about 140° C. and preferably to about 124° C. to about 135° C. Upon completion of the hydrolysis, from about 1× to 10× water is added to dissolve the alkali metal terephthalate and to obtain a clear liquid hydrolysate which can then be subjected to analysis as will be described hereinafter. It is not necessary but it is preferred to add 1× to 10× water after hydrolysis when an aqueous solution of the alkali metal hydroxide is used to give a good solution for gas chromatographic analysis or titration to measure the terephthalyl content. In the event that the aqueous solution of the hydroxide is used, the hydrolysis will require additional time, usually on the order of about thirty minutes.

The polyesters which may be hydrolyzed by the process of this invention include polyesters of reactants (A) at least one difunctional dicarboxylic acid and (B) at least one difunctional glycol. Suitable acids for preparing these polyesters are aliphatic, alicyclic, and aromatic dicarboxylic acids. Examples of such acids include oxalic; malonic; dimethylmalonic; succinic; glutaric; adipic; trimethyl adipic; pimelic; 2,2-dimethylglutaric; azelaic; sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; t-butyl isophthalic; 2,5-norbornane dicarboxylic; 1,4-naphthalic; diphenic; 4,4'-oxydibenzoic; digylcolic; thiodipropionic; 2,2,4-trimethyladipic; 4,4'-sulfonyldibenzoic; 2,5-naphthalene dicarboxylic; 2,6-naphthalene dicarboxylic; and 2,7-naphthalene dicarboxylic acids. It will be understood that the corresponding esters of these acids are included in the term "dicarboxylic acid."

Examples of these esters include dimethyl-1,4-cyclohexanedicarboxylate; dimethyl-2,6-naphthalenedicarboxylate; dimethyl-4,4'-sulfonyldibenzoate; dimethyl isophthalate; dimethyl terephthalate; and diphenyl terephthalate. Copolyesters may be prepared from two or more of the above dicarboxylic acids or esters thereof.

Suitable glycols for preparing these polyesters are aliphatic, alicyclic, and aromatic glycols. Examples of such glycols include ethylene glycol; propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2 - ethyl-2-butyl-1,3-propanediol; 2,2-diethyl-1,3-propanediol; 2-methyl-2-propyl-1,3-propanediol; 2-ethyl-2-isobutyl - 1,3 - propanediol; 1,3-butanediol; 1,4-butanediol; 1,5-pentanediol; 1,6-hexanediol; 2,2,4-trimethyl-1,6-hexanediol; 1,2 - cyclohexanedimethanol; 1,3-cyclohexanedimethanol; 1,4-cyclohexanedimethanol; 2,2,4,4-tetramethyl-1,3-cyclobutanediol; o-, m-, and p-xylene diols; 4,4'-sulfonyldiphenol; 4,4'-oxydiphenol; 4,4'-isopropylidenediphenol; and 2,5-naphthalenediol. Copolyesters may be prepared from two or more of the above diols.

Especially preferred polyesters are poly(ethylene terephthalate) and poly(1,4-cyclohexylenedimethylene terephthalate).

The hydrolysate of the polyester articles is subjected to conventional analysis to indicate the ester and glycol content. In the preferred embodiment poly(ethylene terephthalate) articles are hydrolyzed in order that the terephthalate, ethylene glycol and diethylene glycol contents can be determined. To determine terephthalate content the excess alkali metal hydroxide in the hydrolysate is back titrated using standard hydrochloric acid to the end point of phenolphthalein. To determine the glycol content, a portion of the titrated liquid is subjected to gas chromatographic analysis. In the columns used for this analysis, the 2-methoxyethanol or 2-ethoxyethanol is separated first then ethylene glycol and then diethylene glycol.

The following examples will further illustrate the process of this invention.

EXAMPLE 1

2.000 grams of poly(ethylene terephthalate) powder (80 mesh or finer) was heated in a 250 ml. flask on a hotplate with 2.00 grams of potassium hydroxide pellets (about 35% KOH) and 20.0 ml. of 2-methoxyethanol. The mixture became a semi-solid mass in one minute. 25.0 ml. of water was added and the whole reaction mixture dissolved. Back titration of the excess potassium hydroxide using standard hydrochloric acid to the end point of phenolphthalein showed a terephthalyl value of 68.2% for the polyester powder.

EXAMPLE 2

2.000 grams of poly(ethylene terephthalate) sheeting was heated with 3.068 grams of potassium hydroxide pellets dissolved in 10.00 ml. of water and 10.00 ml. of 2-methoxyethanol in a flask under reflux on a hotplate. After 30 minutes of heating, the liquid was clear and free of solids. It was back titrated with standard acid and the amount needed was subtracted from a blank titration of equivalent reagent without polyester corresponding to 67.6% terephthalyl. The titrated liquid was diluted to 100.00 ml. with water and an 0.005 ml. aliquot was taken for gas chromatographic analysis for ethylene glycol and diethylene glycol. 3.1 mole percent of the total glycols was present as diethylene glycol.

EXAMPLE 3

2.030 grams of poly(ethylene terephthalate) powder (80 mesh or finer) was heated in a 250 ml. flask on a hotplate with 3.030 grams of potassium hydroxide pellets (about 35% KOH) and 20.0 ml. of 2-ethoxyethanol for 5 minutes at 135° C. 50.0 ml. of water was added and the whole reaction mixture dissolved. Phenolphthalein was added and the excess potassium hydroxide was back titrated using standard hydrochloric acid. Terephthalyl equivalent to 1.414 grams was found.

As it can be seen from the foregoing, solid polyesters can be hydrolyzed rapidly by the process of this invention. With the rapid hydrolysis, it is thus possible to rapidly analyze the polyester for glycol content, as for example in less than one hour, whereas the prior art processes required several hours or days for the hydrolysis and analysis. This process thus provides a very rapid control of polyester manufacturing processes.

The invention has been described in detail with particular reference to preferred embodiments thereof, but it will be understood that variations and modifications can be effected within the spirit and scope of the invention.

I claim:

1. A process for hydrolyzing polyesters of repeating glycol and dicarboxylic acid residues comprising intermixing the polyester and 2-methoxyethanol or 2-ethoxyethanol and an alkali metal hydroxide to form a mixture and heating the mixture, said mixture and said heating being sufficient to hydrolyze the polyester.

2. A process for hydrolyzing polyesters of repeating glycol and dicarboxylic acid residues comprising adding the polyester to 2-methoxyethanol or 2-ethoxyethanol in an aqueous solution of an alkali metal hydroxide to form a mixture and heating the mixture, said mixture and said heating being sufficient to hydrolyze the polyester.

3. A process according to claim 2 wherein the alkali metal hydroxide is potassium hydroxide.

4. A process according to claim 2 wherein the polyester is poly(ethylene terephthalate).

5. A process according to claim 2 wherein the alkali metal hydroxide is sodium hydroxide.

6. A process according to claim 2 wherein the polyester is added to 2-methoxyethanol and potassium hydroxide.

7. A process according to claim 2 wherein the mixture is heated to a temperature of 120 to 140° C. for 15 to 30 minutes.

References Cited

UNITED STATES PATENTS 2,917,418  12/1959  Cathcart _____ 260—2.3

FOREIGN PATENTS 490,032  1/1953  Canada _____ 260—2.3

SAMUEL H. BLECH, Primary Examiner

U.S. Cl. X.R.

260—475 D